(12) United States Patent
Puidokas et al.

(10) Patent No.: US 11,077,512 B2
(45) Date of Patent: Aug. 3, 2021

(54) MANUFACTURED ARTICLE AND METHOD

(71) Applicant: General Electric Company, Schenectady, NY (US)

(72) Inventors: Sabrina Michelle Puidokas, Argovia (CH); Matthias Hoebel, Windisch (CH); Jan Vladimir Schwerdtfeger, Argovia (CH); Thomas Etter, Aargau (CH)

(73) Assignee: General Electric Company, Schenectady, NY (US)

( * ) Notice: Subject to any disclaimer, the term of this patent is extended or adjusted under 35 U.S.C. 154(b) by 195 days.

(21) Appl. No.: 16/270,107

(22) Filed: Feb. 7, 2019

(65) Prior Publication Data

US 2020/0254547 A1   Aug. 13, 2020

(51) Int. Cl.
| | |
|---|---|
| *B23K 1/00* | (2006.01) |
| *B33Y 10/00* | (2015.01) |
| *B33Y 40/00* | (2020.01) |
| *B33Y 70/00* | (2020.01) |
| *B33Y 80/00* | (2015.01) |
| *B23K 26/342* | (2014.01) |
| *B23K 26/70* | (2014.01) |
| *B22F 3/24* | (2006.01) |
| *B22F 12/00* | (2021.01) |
| *B22F 5/00* | (2006.01) |

(Continued)

(52) U.S. Cl.
CPC ............ *B23K 1/0008* (2013.01); *B22F 3/24* (2013.01); *B22F 5/009* (2013.01); *B22F 12/00* (2021.01); *B23K 26/342* (2015.10); *B23K 26/703* (2015.10); *B33Y 10/00* (2014.12); *B33Y 40/00* (2014.12); *B33Y 70/00* (2014.12); *B33Y 80/00* (2014.12); *B22F 10/10* (2021.01); *B22F 2003/248* (2013.01); *B22F 2301/15* (2013.01); *B23K 2101/001* (2018.08); *B23K 2103/26* (2018.08)

(58) Field of Classification Search
CPC ............................ B23K 1/0008; B33Y 10/00
See application file for complete search history.

(56) References Cited

U.S. PATENT DOCUMENTS

| | | |
|---|---|---|
| 2016/0089719 A1 | 3/2016 | Lacy |
| 2016/0089859 A1 | 3/2016 | Lacy |
| 2018/0230584 A1* | 8/2018 | Lin ................... B23K 35/3046 |

FOREIGN PATENT DOCUMENTS

| | | |
|---|---|---|
| DE | 102017208659 A1 | 11/2018 |
| EP | 1258545 A1 | 11/2002 |

(Continued)

OTHER PUBLICATIONS

European Patent Office, extended European search report for application No. 20155510.9-1103, dated Apr. 2, 2020, pp. 1-19.

*Primary Examiner* — Weiping Zhu
(74) *Attorney, Agent, or Firm* — Hoffman Warnick LLC (57) ABSTRACT

A manufactured article is comprised of an additively manufactured component having sequentially joined layers of metallic powder. A braze material is disposed on at least a portion of an outer surface of the component. The braze material is located in expected crack locations in the outer surface. At least one crack formed in the outer surface, during a heat treatment, is filled with the braze material. The additively manufactured component comprises a metallic material from a precipitation hardened nickel-based superalloy, which forms a γ' phase.

20 Claims, 3 Drawing Sheets

(51) Int. Cl.
    *B23K 103/18* (2006.01)
    *B23K 101/00* (2006.01)
    *B22F 10/10* (2021.01)

(56) References Cited

FOREIGN PATENT DOCUMENTS

| EP | 3081323 | A1 | 10/2016 |
| EP | 3103570 | A1 | 12/2016 |
| WO | 2015161980 | A1 | 10/2015 |

* cited by examiner

MANUFACTURED ARTICLE AND METHOD

FIELD OF THE INVENTION

The present invention is directed to heat treated articles, and methods of manufacturing heat treated articles that are formed, at least in part, by additive manufacturing. More particularly, aspects of the present invention relate to components and articles, such as components of turbines, having heat treatment to fill cracks formed during thermal treatment and for enhanced performance, extended part life and reduced scrap amounts.

BACKGROUND OF THE INVENTION

Metal additive manufacturing methods enable manufacturers to create end-use metal articles that often outperform those produced with traditional machining and casting techniques. These methods may also enable the manufacture of parts that cannot otherwise be made by conventional methods. And they may provide the benefit of significantly reduced manufacturing costs. Once those articles are installed for end-use, they contribute to cost savings because of one or more of light weight, high strength, better functionality and precise fit. In the context of turbines, particularly gas or steam turbines, a variety of components or portions thereof may be additively manufactured, including, for example: turbine components selected from the group consisting of a hot gas path component, a shroud, a blade (or bucket), a nozzle (vane), and a seal. In some particular examples, combustor components and hot gas path components may be manufactured by additive processes to enable forming of complex geometries without the requirement for extensive post processing, including, but not limited to, nozzle bars, micromixer plenums, combustion flex tips and microchannel cooled shrouds.

Though there are many benefits to be realized with additive manufacturing, in contrast to some conventional manufacturing techniques, articles that are additively manufactured may have surface features that have complex shapes. These complex shapes can be prone to cracking during thermal treatment. Thus, while many advantages can be achieved through additive manufacturing, a drawback is that the resultant cracks can adversely affect performance both in terms of mechanical integrity, the flow dynamics and leakage, and in some cases the parts cannot be used due to compromised flow integrity due to the gaps and cracks. In case repair approaches are implemented to avoid scraping the article, the part would normally first require a sophisticated cleaning process, a fluoride ion cleaning, to remove the oxides from the crack. Finally, a high temperature vacuum brazing process could be implemented to heal the surface cracks.

Accordingly, there is a need in the art for a treatment to reduce cracking in additively manufactured parts that must be thermally treated after the build process.

BRIEF DESCRIPTION OF THE INVENTION

According to an aspect, a manufactured article is comprised of an additively manufactured component having sequentially joined layers of metallic powder. A braze material is disposed on at least a portion of an outer surface of the component. The braze material is located in expected crack locations in the outer surface. At least one crack formed in the outer surface, during a heat treatment, is filled with the braze material. The additively manufactured component comprises a metallic material from a precipitation hardened nickel-based superalloy, which forms a $\gamma'$ phase.

According to another aspect, a method for fabricating a component is provided. The method includes multiple steps. A forming step is used for forming an additively manufactured component having sequentially joined layers of a metallic powder by an additive manufacturing process. An identifying step is for identifying expected crack locations on a surface of the additively manufactured component. An applying step is for applying a braze material to the expected crack locations. A heating step heats the additively manufactured component to one or more desired heating temperatures for one or more desired heating or dwell time periods. A cooling step cools the additively manufactured component to one or more desired cooling temperatures for one or more desired cooling or dwell time periods. The braze material fills in a crack formed during at least one of the heating steps.

According to yet another aspect, a method for fabricating a component includes multiple steps. A forming step forms an additively manufactured component having sequentially joined layers of a metallic powder by an additive manufacturing process. The metallic powder is comprised of a nickel-based superalloy or a cobalt-based superalloy or an iron-based alloy, and the additive manufacturing process is selected from the group consisting of direct metal laser melting, direct metal laser sintering, selective laser melting, or electron beam melting. An identifying step identifies expected crack locations on a surface of the additively manufactured component. An applying step applies a braze material to the expected crack locations. The braze material (or paste) is comprised of a nickel-based superalloy material or a cobalt-based superalloy material, and a binder. A heating step heats the additively manufactured component to one or more desired heating temperatures for one or more desired heating dwell time periods. A cooling step cools the additively manufactured component to one or more desired cooling temperatures for one or more desired cooling dwell time periods. The braze material fills in a crack formed during at least one of the heating steps, and the additively manufactured component is a gas turbine component or a steam turbine component. The metallic powder is comprised of a precipitation hardened nickel-based superalloy, which forms a $\gamma'$ phase.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

In accordance with the disclosure, methods are provided for filling cracks that form in a component during a thermal treatment process. The component may be a gas or steam turbine component. In accordance with the various aspects, the components are formed by one or more of various additive manufacturing methods, such as, for example, direct metal laser melting ("DMLM") made components. Representative examples of components include additively manufactured (by, e.g., DMLM) gas or steam turbine components, including but not limited to any one or more of a combustor, a combustion liner, a transition piece, a hot gas path component, a shroud, a blade (or bucket), a nozzle (vane), a seal, and combinations thereof. In some examples, the components include honeycombs, bucket tips, seals, and fins. In some particular examples, combustor components and hot gas path components may be manufactured by additive processes to enable forming of complex geometries without the requirement for extensive post processing, particularly components having micro-channels and other complex internal passages for cooling, including, but not limited to, nozzle bars, micromixer plenums, combustion flex tips and microchannel cooled shrouds.

In accordance with the disclosure, a component or portion thereof is formed by an additive, or "three-dimensional" (3D) printing process. The additively manufactured component or portion is further processed by application of a braze material, the braze material is provided in select locations to fill subsequent cracks that are formed during a thermal treatment process, particularly on component locations where cracks are expected or where cracks have occurred previously in similar components. According to the methods, the braze material is applied and brazed with a suitable brazing technique as required by the specific braze material and base material.

Additive manufacturing methods generally include any manufacturing method for making and/or forming net or near-net shape structures. As used herein, the phrase "near-net" refers to a structure, such as the component, being formed with a geometry and size very similar to the final geometry and size of the structure, requiring little or no machining and processing after the additive method. As used herein, the phrase "net" refers to the structure being formed with a geometry and size requiring no machining and processing. The structure formed by the additive manufacturing method includes any suitable geometry, such as, but not limited to, square, rectangular, triangular, circular, semi-circular, oval, trapezoidal, octagonal, pyramidal, geometrical shapes having features formed therein, any other geometrical shape, or a combination thereof. For example, the additive method may include forming cooling features.

In general, additive manufacturing processes comprise distributing a material to a selected region on a support or substrate/base and selectively melting or sintering the material with a laser or electron beam, or an equivalent process. A predetermined design file or two-dimensional slices of a three-dimensional file, for example, may be utilized from a computer-aided design program for the formation of the component or portion. The material may be in the form of atomized powder. Examples of additive manufacturing, or three-dimensional printing processes include, but are not limited to, the processes known to those of ordinary skill in the art as Direct Metal Laser Melting ("DMLM"), Direct Metal Laser Sintering ("DMLS"), Selective Laser Sintering ("SLS"), Selective Laser Melting ("SLM"), Electron Beam Melting ("EBM") as well as 'blown powder' additive manufacturing processes, generally known as laser cladding, Laser Powder Fusion ('LPF'), Direct Metal Laser Deposition ('DMLD'), Laser Metal Deposition ('LIVID'), or Laser Metal Forming ('LMF'). As used herein, the term "three-dimensional printing process" refers to the processes described above as well as other suitable current or future processes that include the build-up of materials layer by layer. Suitable materials for three-dimensional printing processes may include, but are not limited to, plastic, thermoplastic, metal, metallic, ceramic, other suitable materials, or a combination thereof. In particular examples, suitable materials for the atomized powder may include, but are not limited to, stainless steel, tool steel, cobalt chrome, titanium, nickel, aluminum, alloys thereof, and combinations thereof.

Thus, the method for fabricating a component or portion according to the instant disclosure includes, in various examples, providing a metallic powder to a substrate surface, heating the metallic powder to a temperature sufficient to join at least a portion of the metallic powder to form an initial layer, and sequentially forming additional layers over the initial layer to form a component or portion thereof. The heating of the metallic powder includes any suitable method, such as, for example, controllably directing a focused energy source toward the metallic powder. Suitable focused energy sources include, but are not limited to, a laser device, an electron beam device, or a combination thereof. The parameters of the focused energy source will depend upon the material of the metallic powder used to form the formed component or portion and/or a desired thickness of each layer of the build.

In some particular embodiments, the material for the atomized powders may include metal alloys, including nickel-based superalloys and cobalt-based superalloys, stainless and alloy steels, and titanium, aluminum and vanadium alloys. A suitable example of a cobalt-based alloy may have a formula (by mass) of Co-0.39-0.41Cr-0.19-0.21Ni-0.14-0.16Fe-0.113-0.205-Mo0.06-0.08-Mn0.015-0.025 (commercially available as Co—Cr—Ni alloy). A suitable example of a nickel-based alloy may have a formula (by mass) of Fe-0.50-0.55Ni-0.17-0.21Cr-0.028-0.033Mo-0.0475-0.055Nb-0.01Co-0.0035Mn-0.002-0.008Cu-0.0065-0.0115Al-0.003Ti (commercially available as Inconel 718) or a formula (by mass) of Ni-0.20-0.23Cr-0.05Fe-0.08-0.10Mo-0.0315-0.0415 Nb+Ta-0.01Co-0.005Mn-0.004Al-0.004Ti (commercially available as Inconel 625). Suitable examples of titanium-based alloys include those known by the trade names Ti-6Al-4Va and Aluminum 6061. In various non-limiting examples, components may include any suitable material, for example, stainless steel, a nickel-based alloy, an iron-based alloy, or any other suitable metal or metallic material. In one embodiment the component or portion thereof, is formed of a stainless steel and/or a nickel-based alloy, such as Hastelloy® X, the aforementioned material being discussed herein as merely illustrative and non-limiting. In some exemplary embodiments, materials for the printed component are selected from CoCrMo (Co-28Cr-6Mo) and Haynes 282 (Ni-20Cr-10Co-8Mo-1.5Al-2Ti), or high-strength, precipitation hardened Ni-superalloys such as Rene108 (Ni-23Cr-11.5Fe-4.2P-6.4Si), Rene80 (60Ni-14Cr-9.5Co-5Ti-4Mo-4W-3Al-0.17C-0.015B-0.03Zr), Inconel 738 (Ni-16Cr-8.5Co-1.7Mo-3.5Al-3.5Ti-1.7Ta-2.5W-0.05Zr-0.09C-0.01B-2Nb) and CM247 (Ni-0.07C-8.1Cr-9.2Co-9.5W-0.5Mo-3.2Ta-5.6Al-0.7Ti-1.4Hf-0.015B-0.015Zr). The metallic powder may be a nickel-based superalloy, a cobalt-based superalloy, an iron-based superalloy, and combinations thereof.

Once formed, the component or portion thereof is further processed by application of a braze material. It will be appreciated that the terms "braze", "brazing". "braze film", "braze material", "braze paste" and "braze coating" as used herein are with reference to surface treatment of a component or portion, such as a turbine component, wherein the process does not include joining workpieces, but rather is performed to affix a braze material directly to the surface of the component to achieve benefits conferred by the resultant braze layer or fill.

In some embodiments according to the invention, the techniques of vacuum brazing are used. As used herein, vacuum brazing means and refers to a process that offers the advantages of providing clean, superior, flux-free braze joints and surfaces of high integrity and strength. The process is performed inside a vacuum chamber vessel for a period of time from about 10-30 minutes at a typical pressure of not more than $8 \times 10^{-4}$ torr, wherein uniform temperatures typically in the range from about 1500° F. to about 2370° F. (815° C.-1300° C.) are maintained on the work piece under continuous heat to thereby reduce or eliminate the stress that can be introduced by other methods where heating and cooling cycles can occur.

Thus, in one non-limiting example, the brazing is accomplished as a single-step vacuum brazing, at a pressure of not more than $8 \times 10^{-4}$ torr, wherein the brazing temperature is between about 1500° F. and about 2370° F., between about 1500° F. and about 1800° F., between about 2000° F. and about 2370° F., between about 1800° F. and about 2370° F., between about 1800° F. and about 2100° F., or any suitable combination, sub-combination, range, or sub-range therein. In one non-limiting embodiment, the brazing duration is between about 1 minute and about 4 hours, between about 1 hour and about 4 hours, between about 1 hour and about 3 hours, or any suitable combination, sub-combination, range, or sub-range therein.

Figure 1:
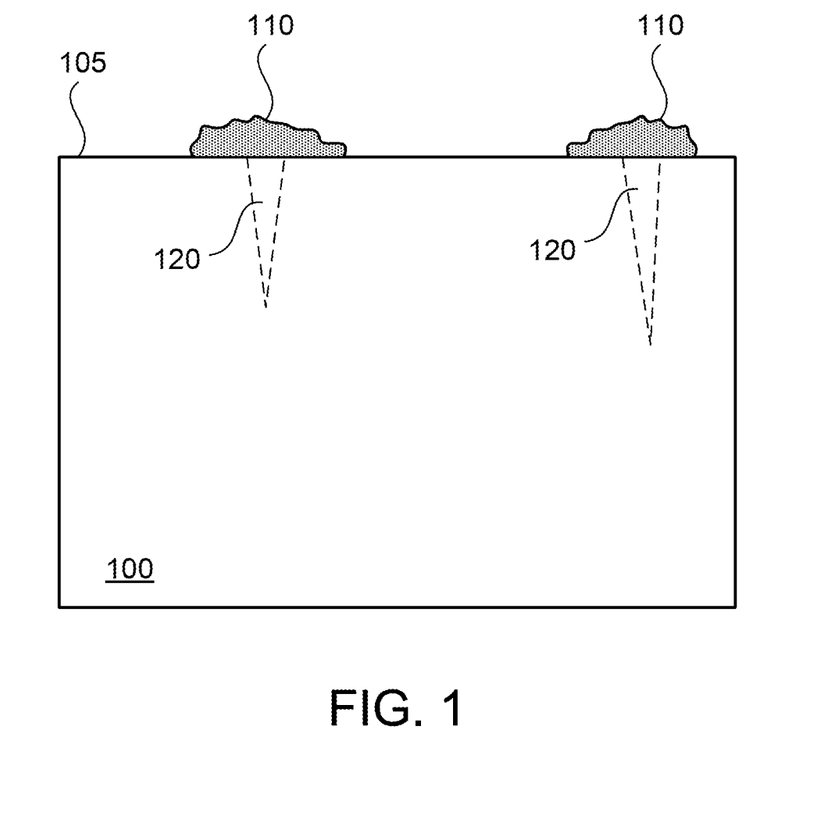
FIG. 1 is a schematic view of a component, according to an aspect of the present disclosure.

Referring now to the drawings, FIG. 1 is a schematic depicting a portion of an additively manufactured component 100 treated in accordance with the disclosure. In accordance with this representative example, a braze material 110 is applied to or disposed on at least a portion of the component 100, such as an outer surface 105. The braze material 110 is located in expected crack locations 120, that may occur during the thermal treatment. Generally, the maximum process temperature is given by the base metal requirements and it could require some compromises from the brazing side. In case the brazing alloy would normally require a lower temperature, a strong flow and spread of the brazing alloy on the base metal could be expected. In order to limit this phenomenon, stop-off in form of spray could be used to completely cover the brazing paste and constrain the flow of braze to the location affected by crack formation. The high cooling rate in direct metal laser melting (DMLM) generates fine grains. Therefore, an increase in tensile strength, hardness and low-cycle fatigue resistance along with a reduction in creep strength is common for DMLM made parts or components. A subsequent annealing or recrystallization process can give a good combination of ductility, strength and creep strength for direct metal laser melted components. However, this thermal treatment (annealing/recrystallization) process can also cause cracks to form in additively manufactured parts. This is particularly true for DMLM components made from precipitation hardened Ni-superalloys, such as Rene80, Rene108, CM247 or Inconel 738. Traditionally, these are casting alloys with very high-strength at elevated operation temperature grace to the precipitation of a strengthening γ' phase. In contrast to the conventional manufacturing by casting, additive manufacturing by DMLM does not generate γ' precipitations in an as-built part or component. Instead, the γ' precipitations only form during the first post-DMLM heat treatment. The formation of this strengthening phase happens in a temperature range, where the component is more brittle than at room temperature. Moreover, the phase transformation induces additional internal stresses, which in combination with the embrittlement can lead to severe cracking. Our inventive approach is to locate braze material 110 selectively on these expected crack locations so that the braze can fill and join the crack surfaces in the base material of the component 100 in-situ. The crack can thus be healed in the same heat treatment cycle while the component is still in the vacuum furnace at elevated temperature. On the one hand this ensures excellent braze wettability, as no oxide layer has formed, when the cracks occur. On the other hand, this has a significant commercial benefit, as the effort and cost for a fluoride ion cleaning process required to remove oxides from the crack and the subsequent braze repair cycle can be avoided.

The component 100 or portion thereof is characterized in some examples as having braze material 110 applied to any one or more of an internal surface (as long as it can be accessed for braze paste and braze stop application) and an external surface on a metallic substrate, which surfaces may include any one or more of planes, corners, curves, and contours and may further include cracks or other gaps on the surface and penetrating into the substrate of component 100. With specific reference again to FIG. 1, the component 100 has expected crack locations 120, which may be in known areas susceptible to cracking or in regions with complex shapes. According to the methods, and as depicted in FIG. 1, the braze material 110 is applied after the additive manufacturing process of building component 100.

In accordance with the methods, the braze material 110 comprises known or novel low or high melt materials, and in particular, for use with nickel-based superalloys, the braze materials are particularly metallurgically compatible with such nickel-based superalloys. In accordance with the example, the braze material includes, but is not limited to, metal alloys and superalloys, including nickel-based superalloys and cobalt-based superalloys, alloys and combinations thereof. Suitable examples of a nickel-based alloy may have a formula (by mass) of Ni-14Cr-10Co-3.5Al-2.5Ta-2.75B-0.05Y (commercially available as Amdry DF-4B from Oerlikon Metco, located in Westbury, N.Y.) or a formula (by mass) of Ni-19Cr-10Si (commercially available as BNi-5 from many providers, including Wall Colmonoy, located in Madison Heights, Mich.). Of course, it will be appreciated that other base materials may be used for forming components by additive manufacturing, and as such, other braze materials may be selected, which may be high melt, low melt or other than high/low melt.

The proposed manufacturing method includes a tailored heat treatment, which is designed to meet simultaneously two requirements. On the one hand it ensures the microstructural requirements of the DMLM part or component by an appropriate recrystallization (ReX), on the other hand, the temperature cycle allows simultaneously an in-situ braze repair, if cracks are formed at expected locations.

Figure 2:
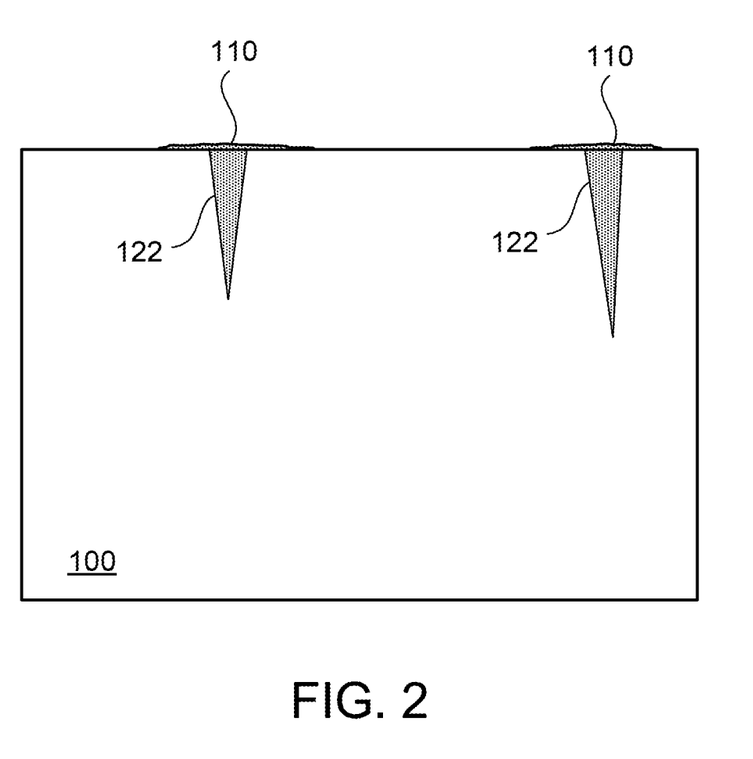
FIG. 2 illustrates a schematic depicting a portion of an additively manufactured component treated in accordance with the disclosure.

FIG. 2 illustrates a schematic depicting a portion of an additively manufactured component 100 treated in accordance with standard procedures. The component 100 has been thermally treated and cracks 122 formed in expected crack locations 120 (as shown in FIG. 1). Such crack formation during the first heat treatment cycle is very likely for precipitation hardened Ni-superalloys processed by DMLM. The proposed in-situ repair method discloses a method, where such cracks can be healed in the same heat treatment cycle, when and where the cracks occur.

Figure 3:
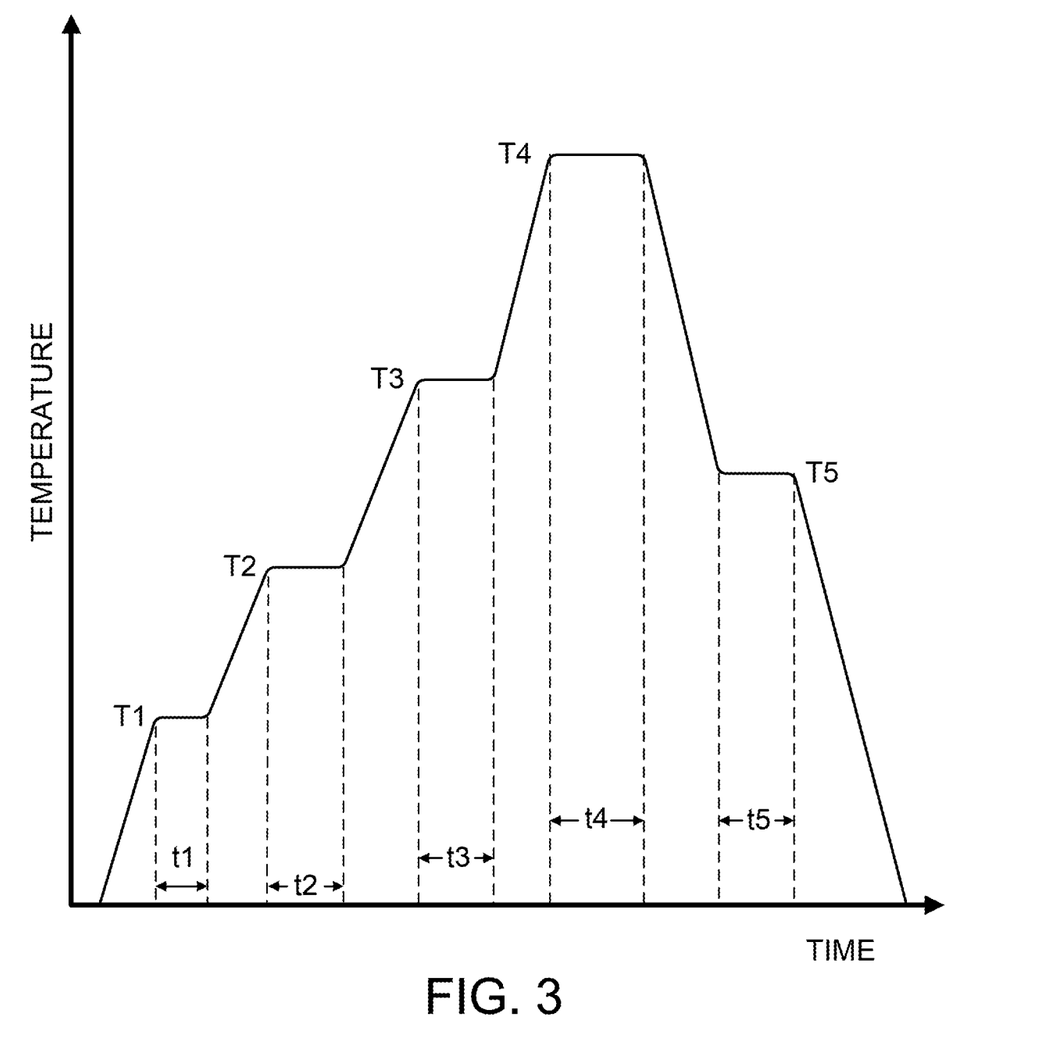
FIG. 3 illustrates an example of a thermal treatment process for an additively manufactured component treated in accordance with the disclosure.

Referring to FIG. 3, this thermal treatment process may include heating the component to a first temperature $T_1$ and holding the component at that first temperature for a predetermined first time period $t_1$, which has to be long enough to ensure a uniform temperature profile in the part and the evaporation of the binder contained in the brazing paste/material. If the component is made from a precipitation hardened Ni-superalloy, the first hold temperature $T_1$ should be about 20-100K below the onset of γ' formation, which typically goes along with a reduction of the thermal expansion coefficient of the DMLM material. Once the component has reached a uniform temperature after $t_1$, the component 100 is quickly ramped up to a second temperature $T_2$ at a high ramp rate $v_2>20K/min$. The high heating rate shall suppress as much as possible the formation of the γ' phase in the intermediate low ductility temperature range, where the DMLM part is brittle and where there is therefore a high risk of severe cracking. Still, it is often not possible even with such high heating rates $v_2$ to completely avoid the formation of macro cracks. Macro cracks form in particular at locations, where a high amount of frozen internal stress from processing is present or where the component design is not optimized leading to local stress peaks. In many cases, the cracks that need to be repaired thus occur during the temperature ramp from Ti to the upper temperature $T_2$. In a preferred embodiment, $T_2$ is greater than or equal to about 850° C. and chosen high enough, that the high-strength DMLM material has again become ductile allowing the relaxation of remaining internal stresses in the DMLM part. At the same time, $T_2$ is kept below the solidus temperature of the chosen braze alloy material to avoid partial flow of braze material 120 into the cracks 122, that may have formed during the transition from $T_1$ to $T_2$. The heating or dwell time $t_2$ at $T_2$ ensures again a homogeneous temperature profile of the DMLM component, before a further temperature increase to $T_3$ is initiated. At the same time most of the remaining residual stresses will have relaxed after the hold or dwell time $t_2$. Thereafter, the temperature is further increased at a rate $v_3$ of about 15-30K/minute to a temperature level $T_3$ and held there for dwell time $t_3$, which temperature is set above the liquidus temperature of the braze material 120. Ideally, the temperature level $T_3$ is chosen approximately 30K to 100K below the final recrystallisation temperature $T_4$ of the DMLM alloy. During the temperature increase from $T_3$ to $T_4$, the braze material 120 becomes liquid. If a crack 122 had formed previously during the same heat treatment cycle the braze material can now flow into the crack 122 and fill it. Braze material 120 will then remain in the liquid state during the dwell time at the recrystallisation temperature $T_4$. Contrary to the previous temperature ramp, temperature increases now happen at a slow heating rate $v_4<5K/min$ to avoid temperature overshoots that could lead to local incipient melting. The component is kept at $T_4$ for a recrystallization dwell time $t_4$, which has to be long enough to obtain the desired recrystallization microstructure of the DMLM part. At the same time, braze material 120 completely fills the crack 122 and braze diffusion occurs leading to a more homogeneous elemental distribution in the zone of crack repair. In some cases, the recrystallisation temperature $T_4$ may be above typical temperatures recommendations of braze suppliers. As a positive side effect of such high temperatures $T_4$, diffusion rates are higher and the formation of detrimental brittle phases in the braze joint is significantly reduced. Following the recrystallisation of the DMLM part and crack healing at $T_4$, the component is slowly cooled down at a rate $v_5<-5K/min$ to another intermediate temperature $T_5$ and held there for a dwell time $t_5$, which temperature is set to a level, where the braze becomes again solid. $T_5$ shall not be set more than 50K below the solidus temperature of the braze and the slow cooling from $T_4$ to $T_5$ shall prevent failures in the repaired braze joint due to fast cooling of the still ductile braze material. After reaching $T_5$, the cooling rate $v_6$ to ambient temperature is increased to values in the range from −15K/min to −50K/min to remain compliant with other microstructural requirements of the component until finally ambient temperature is reached. In this example, the horizontal axis is time and the vertical axis is temperature, and the first temperature $T_1$ is lower than the second temperature $T_2$, the third temperature $T_3$ is higher than the second temperature $T_2$ and the final recrystallisation temperature $T_4$ is higher than $T_3$. This five-tiered thermal treatment is one example only and more or less than four heating temperatures and one intermediate cooling temperature may be employed as desired for the specific component or material used.

In accordance with the various embodiments, the methods described herein provide components having sealed cracks as compared with as-printed and thermally treated additively manufactured components. The methods disclosed herein may also seal surface cracks present on external and internal surfaces that are artifacts of the additive manufacturing process. Treated components demonstrate enhanced surface properties that confer enhanced resistance to corrosion, oxidation, and erosion, as well as increased lifetime. At the same time the proposed method significantly increases the yield of additive DMLM production, in particular, for components made from high-strength precipitation hardened Ni-superalloys, which are difficult to manufacture without severe defects.

Thus, a technical advantage of the present method and heat treatment includes higher quality, improved yield and greater longevity of additively manufactured parts. Another advantage is reduction of cost associated with repairs as no separate braze repair cycle is required. Additionally, no expensive and time-consuming cleaning process for the cracks is required since such cracks form in a vacuum atmosphere and as a consequence are not oxidized. Another advantage is the option of selecting high-strength powder materials for the additively manufactured parts, including nickel-based superalloys with a high content of the strengthening γ' phase. These parts may now be heat treated according to the instant disclosure with braze material to seal cracks or other defects.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:
1. A method for fabricating a component, comprising the steps of:
   forming an additively manufactured component having sequentially joined layers of a metallic powder by an additive manufacturing process;
   applying a braze material to an expected crack location on a surface of the additively manufactured component;

heating the additively manufactured component to one or more heating temperatures for one or more heating dwell time periods, wherein the heating includes:
- heating the additively manufactured component to a first temperature and maintaining the additively manufactured component at the first temperature for a first dwell time period; and
- heating the additively manufactured component to a second temperature and maintaining the additively manufactured component at the second temperature for a second dwell time period,
- wherein the first temperature is lower than the second temperature, and wherein the second temperature is at a temperature level where the braze material remains in a solid state;

cooling the additively manufactured component to a cooling temperature for a cooling dwell time period; and
wherein the braze material fills in a crack formed during the heating.

2. The method for fabricating a component according to claim 1, wherein the metallic powder is selected from the group consisting of:
a nickel-based superalloy, a cobalt-based superalloy, an iron-based superalloy, and combinations thereof.

3. The method for fabricating a component according to claim 1, wherein the additively manufactured component is formed from a precipitation hardened nickel-based superalloy, which forms a γ' phase.

4. The method for fabricating a component according to claim 3, wherein the first temperature is about 20-100K below an onset of formation of the γ' phase.

5. The method for fabricating a component according to claim 1, wherein the braze material is comprised of a nickel-based alloy or a cobalt-based alloy.

6. The method for fabricating a component according to claim 1, wherein the braze material is only applied to the expected crack location.

7. The method for fabricating a component according to claim 1, wherein the braze material is applied to an entire surface of the component.

8. The method for fabricating a component according to claim 1, wherein the heating step heats the additively manufactured component to the first temperature and then subsequently heats the additively manufactured component to the second temperature, and then subsequently heats the additively manufactured component to a third temperature, and wherein the second temperature is lower than the third temperature and where the third temperature is kept at 30K to 100K below a recrystallization temperature of the additively manufactured component.

9. The method for fabricating a component according to claim 1, wherein the heating step heats the additively manufactured component to the first temperature and then subsequently heats the additively manufactured component to the second temperature, and then subsequently heats the additively manufactured component to the third temperature, and then subsequently heats the additively manufactured component to a fourth temperature and wherein the third temperature is lower than the fourth temperature and wherein recrystallization of the additively manufactured component occurs at the fourth temperature.

10. The method for fabricating a component according to claim 9, wherein the braze material remains in a liquid state during a fourth dwell time period at the fourth temperature where the recrystallization of the additively manufactured component occurs.

11. The method for fabricating a component according to claim 1, wherein the additive manufacturing process is selected from the group consisting of direct metal laser melting, direct metal laser sintering, selective laser melting, electron beam melting, and combinations thereof.

12. The method for fabricating a component according to claim 1, wherein the additive manufacturing process is selected from the group consisting of laser cladding, laser powder fusion, direct metal laser deposition, laser metal deposition, and laser metal forming.

13. The method for fabricating a component according to claim 1, wherein the additively manufactured component includes a gas turbine component or a steam turbine component.

14. The method for fabricating a component according to claim 13, wherein the additively manufactured component is selected from the group consisting of a combustor, a combustion liner, a combustion flex tip, a transition piece, a hot gas path component, a shroud, a blade, a nozzle, and a seal.

15. The method for fabricating a component according to claim 1, the method further including applying a spray to cover the brazing material and constraining a flow of the braze material to the expected crack location.

16. The method for fabricating a component according to claim 1, the method further including: selectively applying the braze material only on the expected crack location, and filling the crack with the braze material and simultaneously healing the crack during the heating.

17. The method for fabricating a component according to claim 1, wherein after the first dwell time period passes, the method further includes increasing the first temperature to the second temperature at a rate of greater than 20K per minute.

18. The method for fabricating a component according to claim 1, wherein the second temperature is greater than or equal to about 850° C., and is below a solidus temperature of the braze material.

19. The method for fabricating a component according to claim 1, wherein after the second dwell time period passes, the method further includes increasing the second temperature to the third temperature, where the third temperature is greater than a liquidus temperature of the braze material.

20. A method for fabricating a component, comprising the steps of:
forming an additively manufactured component having sequentially joined layers of a metallic powder by an additive manufacturing process, wherein the metallic powder includes a nickel-based superalloy or a cobalt-based superalloy or an iron-based alloy, and the additive manufacturing process is selected from the group consisting of direct metal laser melting, direct metal laser sintering, selective laser melting, and electron beam melting;
applying a braze material to an expected crack location on a surface of the additively manufactured component,
the braze material includes a nickel-based superalloy material or a cobalt-based superalloy material;
heating the additively manufactured component to one or more desired heating temperatures for one or more heating dwell time periods, wherein the heating includes:
- heating the additively manufactured component to a first temperature and maintaining the additively manufactured component at the first temperature for a first dwell time period; and
- heating the additively manufactured component to a second temperature and maintaining the additively manufactured component at the second temperature for a second dwell time period,
wherein the first temperature is lower than the second temperature, and wherein the second temperature is at a temperature level where the braze material remains in a solid state;

cooling the additively manufactured component to a cooling temperature for a cooling dwell time period; and wherein the braze material fills in a crack formed during the heating, and the additively manufactured component is a gas turbine component or a steam turbine component, and wherein the metallic powder includes a precipitation hardened nickel-based superalloy, which forms a γ' phase.

* * * * *